(12) United States Patent
Hisanaga et al.

(10) Patent No.: US 8,893,485 B2
(45) Date of Patent: Nov. 25, 2014

(54) EXHAUST HEAT RECOVERY APPARATUS

(75) Inventors: Toru Hisanaga, Shizuoka (JP); Akihiro Kawamata, Shizuoka (JP); Tamaki Kuniyoshi, Shizuoka (JP); Takatoshi Miyabe, Saitama (JP); Masayoshi Mori, Saitama (JP)

(73) Assignees: Yutaka Giken Co., Ltd. (JP); Honda Motor Co., Ltd. (JP)

( * ) Notice: Subject to any disclaimer, the term of this patent is extended or adjusted under 35 U.S.C. 154(b) by 391 days.

(21) Appl. No.: 13/478,313

(22) Filed: May 23, 2012

(65) Prior Publication Data
US 2012/0297754 A1 Nov. 29, 2012

(30) Foreign Application Priority Data

May 27, 2011 (JP) ................................. 2011-119091

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 5/02* | (2006.01) |

(52) U.S. Cl.
CPC ............... *F01N 5/02* (2013.01); *F01N 2410/00* (2013.01); *Y02T 10/16* (2013.01); *F01N 2390/08* (2013.01)
USPC .................................. 60/320; 60/323; 60/324

(58) Field of Classification Search
USPC ............................................. 60/320, 323, 324
See application file for complete search history.

(56) References Cited

U.S. PATENT DOCUMENTS

| | | | | |
|---|---|---|---|---|
| 2010/0043413 | A1* | 2/2010 | Orihashi et al. | 60/320 |
| 2010/0146943 | A1* | 6/2010 | Muramatsu et al. | 60/286 |
| 2010/0146954 | A1* | 6/2010 | Sloss et al. | 60/320 |
| 2011/0247318 | A1* | 10/2011 | Kuroyanagi et al. | 60/278 |
| 2011/0302910 | A1* | 12/2011 | Burgers et al. | 60/299 |
| 2012/0017575 | A1* | 1/2012 | Sloss | 60/320 |

FOREIGN PATENT DOCUMENTS

JP 2009030569 2/2009

\* cited by examiner

*Primary Examiner* — Thomas Denion
*Assistant Examiner* — Dapinder Singh
(74) *Attorney, Agent, or Firm* — Adams & Wilks (57) ABSTRACT

An exhaust heat recovery apparatus includes a joining section extending from a downstream end portion of a second flow passage section to a first flow passage section. The joining section has a communication port formed proximate a valve shaft for directing an exhaust gas from the second flow passage section into a housing section. A valve includes a first valve body supported by the valve shaft for closing a downstream end portion of the first flow passage section, and a second valve body extending from the first valve body for closing the communication port. The first valve body and the second valve body are disposed circumferentially of the valve shaft. The second valve body has an arc-shape having a center provided by the valve shaft.

3 Claims, 8 Drawing Sheets

EXHAUST HEAT RECOVERY APPARATUS

FIELD OF THE INVENTION

The present invention relates to an exhaust heat recovery apparatus having a medium heated by a heat of an exhaust gas.

BACKGROUND OF THE INVENTION

Figure 8:
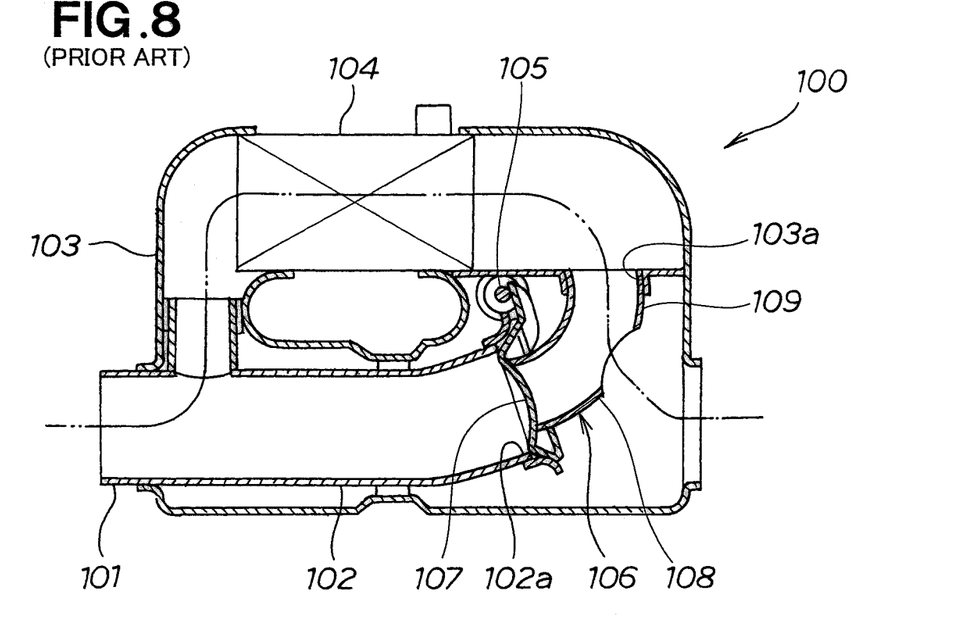
FIG. 8 is a cross-sectional view of a prior art exhaust heat recovery apparatus.

An exhaust heat recovery apparatus includes a heat exchanger having a medium to be heated by a heat of an exhaust gas generated within an internal combustion engine. Such an exhaust heat recovery apparatus is known from, for example, JP-A-2009-30569. FIG. 8 hereof shows an exhaust heat recovery apparatus disclosed in JP-A-2009-30569.

As shown in FIG. 8, an exhaust heat recovery apparatus 100 has an inlet port portion 101 for introducing an exhaust gas, a first flow passage portion 102 extending from the inlet port portion 101, and a second flow passage portion 103 bypassing the first flow passage portion 103 above the first flow passage portion 102. The exhaust heat recovery apparatus 100 also includes a heat exchanger 104 disposed in the second flow passage portion 103 for providing heat exchange between an exhaust gas and a medium. The apparatus 100 further includes a valve shaft 105 disposed proximate a downstream end 102*a* of the first flow passage portion 102, and a valve 106 supported by the valve shaft 105.

The valve 106 includes a first valve body 107 supported by the valve shaft 105, and a second valve body 108 extending from a back side of the first valve body 107 toward a downstream end 103*a* of the second flow passage portion 103.

When a temperature of a medium flowing through the heat exchanger 104 is low, the downstream end 102*a* of the first flow passage portion 102 is closed by the first valve body 107. With the downstream end 102*a* closed by the first valve body 107, an exhaust gas is directed into the second flow passage portion 103 for heat exchange between the exhaust gas and the medium in the heat exchanger 104. The medium is heated due to the heat exchange. When the medium is sufficiently heated, the valve shaft 105 is rotated causing the second valve body 108 to close the downstream end 103*a* of the second flow passage portion 103. With the downstream end 103*a* closed by the second valve body 108, the heat exchange does not occur.

The valve 106 includes a guide portion 109 extending from a distal end portion of the second valve body 108 to the downstream end 103*a* of the second flow passage portion for guiding the second valve body 108 so as to precisely close the second flow passage portion 103. However, since the valve 106 includes this guide portion 109, a size of the valve 106 is undesirably large.

SUMMARY OF THE INVENTION

It is an object of the present invention to provide a compact exhaust heat recovery apparatus having a small-sized valve.

According to one aspect of the present invention, there is provided an exhaust heat recovery apparatus comprising: an inlet section for introducing an exhaust gas thereinto, the inlet section having a downstream end; a branched section connected to the downstream end of the inlet section; a first flow passage section having one end connected to the branched section, the first flow passage section extending downstream from the branched section, the first flow passage section having a downstream end portion; a second flow passage section extending downstream from the branched section and bypassing the first flow passage section, the second flow passage section having a downstream end portion; a heat exchanger disposed within the second flow passage section for providing heat exchange between an exhaust gas and a medium disposed within the second flow passage section; a joining section extending from the downstream end portion of the second flow passage section to the first flow passage section; a housing section connected to the joining section and the downstream end portion of the first flow passage section; a valve shaft supported by the housing; a valve supported by the valve shaft for rotating in such a manner that the exhaust gas introduced into the inlet section flows through the branched section and at least one of the first flow passage section and the second flow passage section, wherein the joining section has a communication port formed proximate the valve shaft for directing an exhaust gas from the second flow passage section into the housing section, wherein the valve includes a first valve body supported by the valve shaft for closing the downstream end portion of the first flow passage section, and a second valve body extending from the first valve body for closing the communication port of the joining section, wherein the first valve body and the second valve body are disposed circumferentially of the valve shaft, and wherein the second valve body has an arc-shape having a center provided by the valve shaft.

The communication port is formed proximate the valve shaft for directing the exhaust gas from the second flow passage section into the housing section, and the second valve body extending from the first valve body closes the communication port. That is, the second valve body is attached to the first valve body supported by the valve shaft and the communication port is formed proximate the valve shaft. Since the communication port is formed proximate the valve shaft, the second valve body extending from the first valve body is small in size, and hence the valve including the small-sized second valve body is also small in size.

The second valve body has the arc-shaped having the center provided by the valve shaft. The second valve body formed into the arc-shape has the advantage that the second valve body can rotate in a small area from an open position in which the communication port is open to a closed position in which the communication port is closed. Since the second valve body can rotate in the small area, the housing section accommodating the valve is small in size, and hence the exhaust heat recovery apparatus including the small-sized housing section is also small in size.

Preferably, the joining section has a protrusion portion protruding in a direction away from the housing section. The joining section including the protrusion portion has the advantage that the joining section defines a flow path having an increased area to allow an exhaust gas to flow smoothly through the flow path during heat exchange in the heat exchanger. It is thus unnecessary that the heat exchanger have a large size to define a flow path having an increased area. Since an exhaust gas smoothly flows through the flow path having the increased area, an efficiency of heat exchange occurring in the heat exchanger is increased.

Preferably, the second valve body is spaced a predetermined distance from the communication port when the second valve body closes the communication port. In other words, a small gap is formed between the second valve body and the communication port. Forming the small gap prevents contact between the second valve body and the joining section. Thus, it is not likely that a noise is made due to contact between the second valve body and the joining section. There is no need to provide the valve with an additional member for preventing the noise, whereby the valve has the reduced number of parts. Since the gap is formed between the second valve body and the communication port, the valve can rotate smoothly even if the joining section or the second valve body is expanded by a heat of ah exhaust gas.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
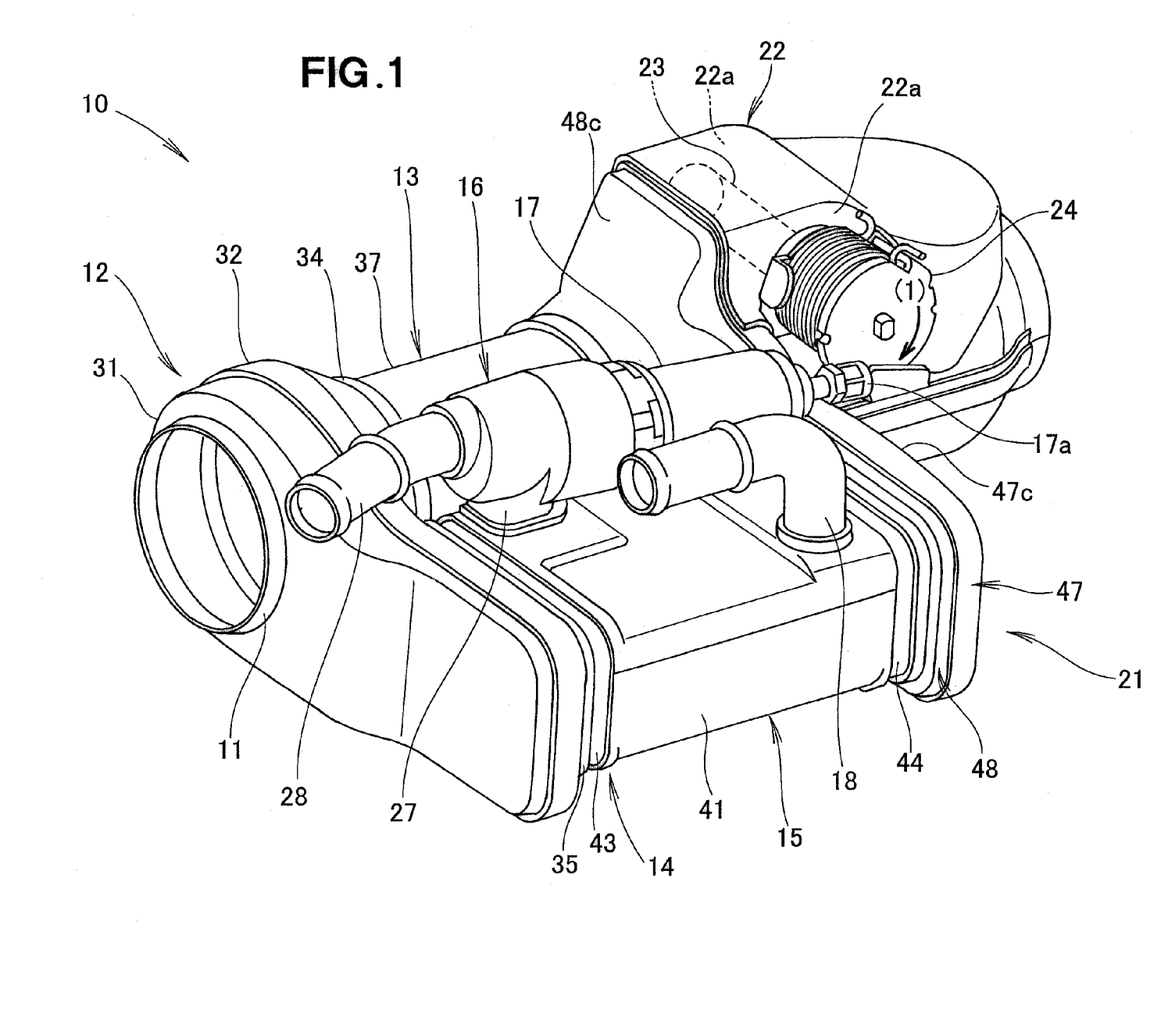
FIG. 1 is a perspective view of an exhaust heat recovery apparatus.
Figure 2:
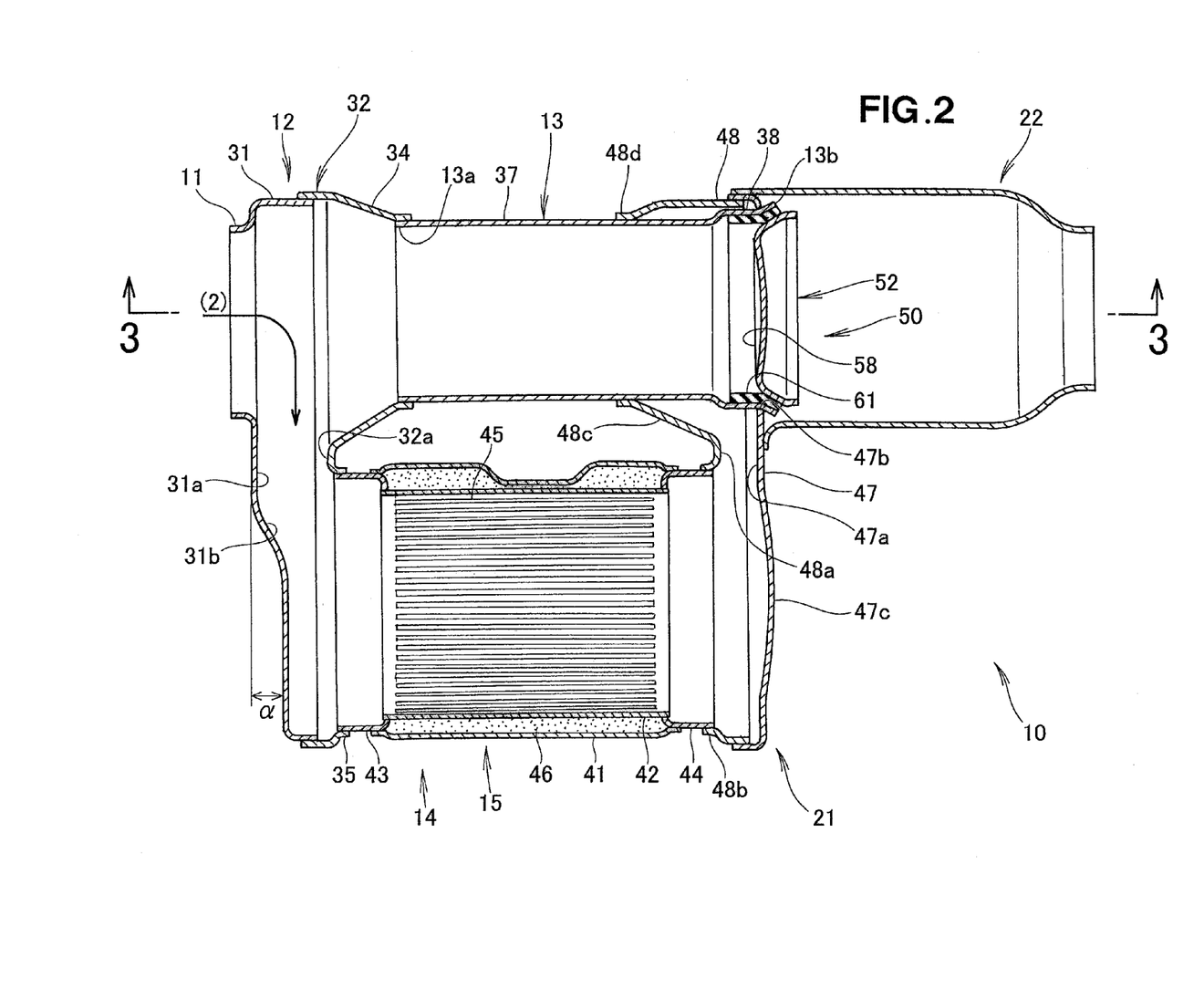
FIG. 2 is a cross-sectional view of the exhaust heat recovery apparatus shown in FIG. 1.

Referring to FIG. 1 and FIG. 2, an exhaust heat recovery apparatus 10 according to the present invention includes an inlet section 11 for introducing an exhaust gas thereinto and a branched section 12 formed integrally with the inlet section 11. The apparatus 10 also includes a first flow passage section 13 connected to the branched section 12 and extending downstream from the branched section 12, and a second flow passage section 14 extending downstream from the branched section 12 and bypassing the first flow passage section 13. The apparatus 10 further includes a heat exchanger 15 disposed in the second flow passage section 14 for providing heat exchange between an exhaust gas and a cooling water (a medium) in the second flow passage section 14. Furthermore, the apparatus 10 includes a medium introducing member 16 attached to a top surface of the heat exchanger 15 for introducing a cooling water (a medium) into the heat exchanger 15. In addition, the apparatus 10 includes a thermo-actuator 17 supported by the medium introducing member 16 and controlled by a temperature of the medium. Moreover, the apparatus 10 includes a medium discharging tube 18 disposed sidewardly of the thermo-actuator 17 for discharging the medium from the heat exchanger 15. The apparatus 10 also includes a joining section 18 extending a downstream end portion of the second flow passage section 14 to the first flow passage section 13. The apparatus 10 further includes a housing section 22 connected to the joining section 21 and a downstream end portion 13b of the first flow passage section 13. Furthermore, the apparatus 10 includes a valve shaft 23 supported by a pair of sidewalls 22a, 22a of the housing section 22. Additionally, the apparatus 10 includes an urging member 24 connected to the valve shaft 23 and disposed sidewardly of the housing section 22 for urging the valve shaft 23.

The medium introducing member 16 includes a support portion 27 attached to the heat exchanger 15, and a medium introducing tube 28 supported by the support portion 27 for introducing a medium thereinto. The support portion 27 supports the thermo-actuator 17 as well as the medium introducing tube 28. The thermo-actuator 17 is controlled by a temperature of a medium passing through the support portion 27.

The urging member 24 is in contact with a distal end portion 17a of the thermo-actuator 17 and urges the valve shaft 23 in a clockwise direction as shown by an arrow (1).

As shown in FIG. 2, the branched section 12 includes a first member 31 having a bottom portion 31a having the inlet section 11 formed thereon, and a second member 32 welded to the first member 31 with the first member 31 fitted into the second member 32.

The bottom portion 31a of the first member 31 has a ramp 31b extending toward the second member 32. By means of the ramp 31b, the bottom portion 31a is partially offset a distance a toward the second member 32. The ramp 31b provides the branched section 12 with an increased rigidity and enables smooth flow of an exhaust gas. Since the ramp 31b extends toward the second member 32, the branched section 12 is compact.

The second member 32 includes a first connection portion 34 disposed downstream of the branched section 12 and connected to an upstream end portion 13a of the first flow passage section 13. The second member 32 includes a bottom portion 32a defining a second connection portion 35 connected to the second flow passage section 14.

The first connection portion 34 has a diameter gradually reducing from the bottom portion 32a to the upstream end portion 13a. The first flow passage section 13 includes a cylindrical base portion 37 connected to the first connection portion 34 and an enlarged diameter portion 38 formed integrally with a downstream end of the cylindrical base portion 37.

The heat exchanger 15 is connected to the second connection portion 35 of the second member 32. The heat exchanger 15 includes a core case 41 defining a body of the heat exchanger 15 and a heat transfer tube 42 housed in the core case 41 for allowing an exhaust gas to flow inside the heat transfer tube 42. The heat exchanger 15 also includes an upstream end plate 43 supporting an upstream end portion of the heat transfer tube 42 and connected to the second connection portion 35, and a downstream end plate 44 supporting a downstream end portion of the heat transfer tube 42 and connected to the joining section 21. The heat exchanger 15 further includes fins 45 disposed within the heat transfer tube 42 and providing increased areas for contact with an exhaust gas flows.

The heat transfer tube 42 is provided in plural and the plural heat transfer tubes 42 are arranged in a direction perpendicular to a sheet of FIG. 2. Each of the plural heat transfer tubes 42 is equipped with the fins 45. An exhaust gas flows through the heat transfer tubes 42 to heat a medium (a cooling water 46) flowing along outer peripheries of the heat transfer tubes 42. This results in heat exchange between the exhaust gas and the medium.

The joining section 21 includes a first member 47 connected to the enlarged diameter portion 38 and a second member 48 fitted into and welded to the first member 47. The first member 47 includes a bottom 47a having an opening 47b into which is fitted the enlarged diameter portion 38 of the first flow passage section 13. The bottom 47a includes a convex portion 47c protruding in a direction away from the heat exchanger 15. The convex portion 47c of the bottom 47a provides the joining section 21 with an increased rigidity and enables smooth flow of an exhaust gas.

The second member 48 includes a bottom 48a having a connection portion 48b connected to the downstream end plate 44 of the heat exchanger 15. The bottom 48a also has a protrusion portion 48c protruding in a direction away from the housing section 22. The second member 48 including the protrusion portion 48c has the advantage that the second member 48 defines a flow path having an increased area to allow an exhaust gas smoothly flow through the flow path during heat exchange in the heat exchanger 15. It is thus unnecessary that the heat exchanger have a large size to define a flow path having an increased area. Since an exhaust gas smoothly flows through the flow path having the increased area, an efficiency of heat exchange occurring in the heat exchanger is increased.

The protrusion portion 48c has a distal end 48d welded to an outer peripheral surface of the first flow passage section 13. Since the distal end 48d is welded to the outer peripheral surface of the first flow passage section 13, the first flow passage section 13 is securely supported by the protrusion portion 48c.

The housing section 22 houses the downstream end portion 13b of the first flow passage section 13 and a valve 50. The valve 50 shown in FIG. 2 closes the downstream end portion 13b of the first flow passage section 13.

Figure 3:
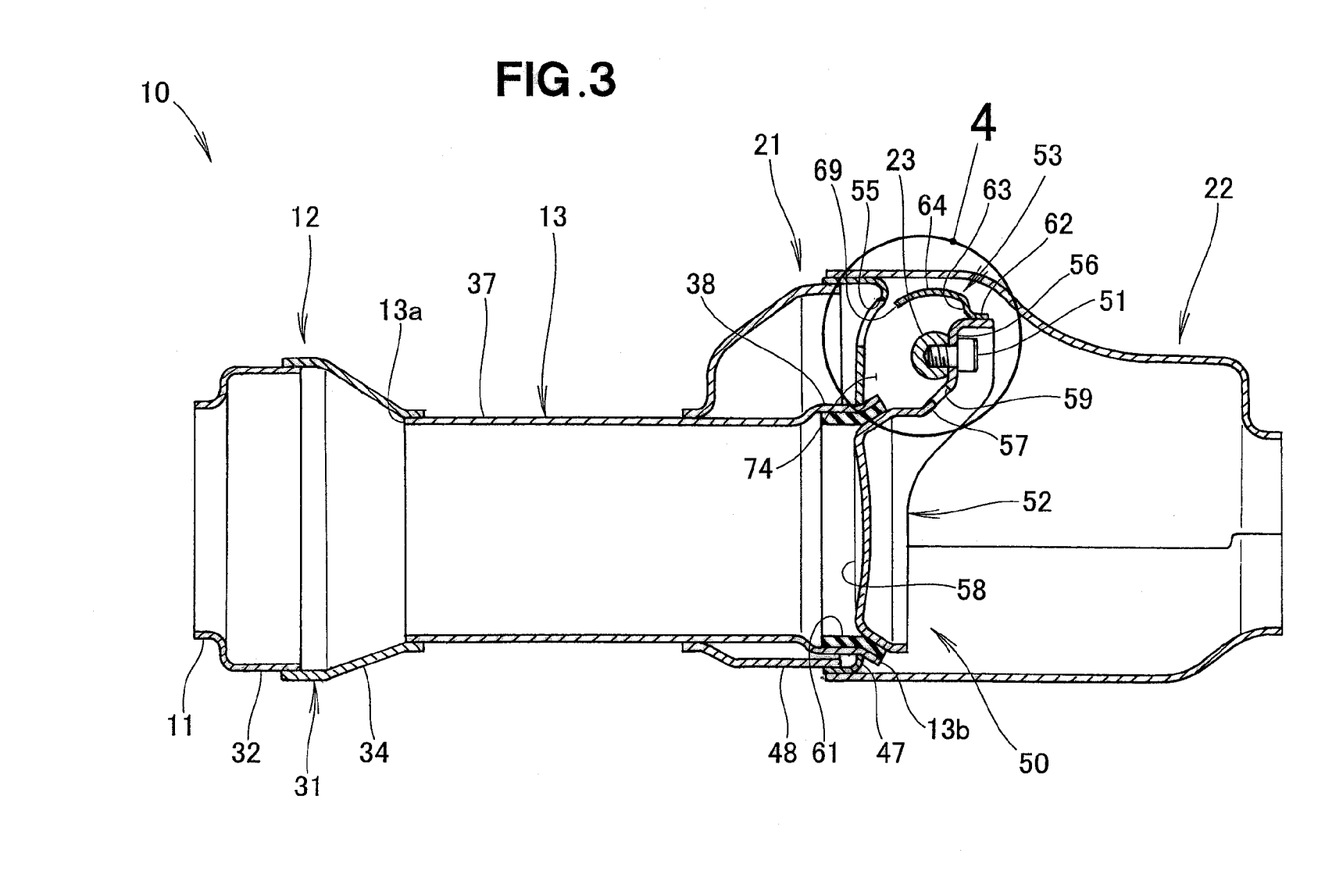
FIG. 3 is a cross-sectional view taken along line 3-3 of FIG. 2.

As shown in FIG. 3, the valve 50 includes a first valve body 52 attached through a bolt 51 to the valve shaft 23 for closing the downstream end portion 13b of the first flow passage section 13, and a second valve body 53 extending from a top portion of the first valve body 52 toward the first member 47. The first valve body 52 and the second valve body 53 are disposed along a periphery of the valve shaft 23.

The joining section 21 has a communication port 55 formed proximate the valve shaft 23 for directing an exhaust gas from the second flow passage section 14 (FIG. 2) into the housing section 22. The second valve body 53 is rotatable to close the communication port 55.

The first valve body 52 includes a fixed portion 56 secured to the valve shaft 23, an extension portion 57 extending from the fixed portion 56 toward the downstream end portion 13b of the first flow passage section 13, and a body portion 58 formed on a distal end of the extension portion 57 for closing the downstream end portion 13b of the first flow passage section 13.

The extension portion 57 has a portion defining an exhaust hole 59 for discharging a part of an exhaust gas discharged out of the communication port 55. Formation of the exhaust hole 59 enables smooth flow of the exhaust gas discharged out of the communication port 55.

The body portion 58 is in contact with a seat member 61 attached to an inner circumference of the enlarge diameter portion 38 of the first flow passage section 13. The enlarged diameter portion 38 is larger in diameter than the cylindrical base portion 37 by a thickness of the seat member 61. As a result, the enlarged diameter portion 38 provides a flow passage having the same cross-sectional area as that of a flow passage provided by the base portion 37.

Figure 4:
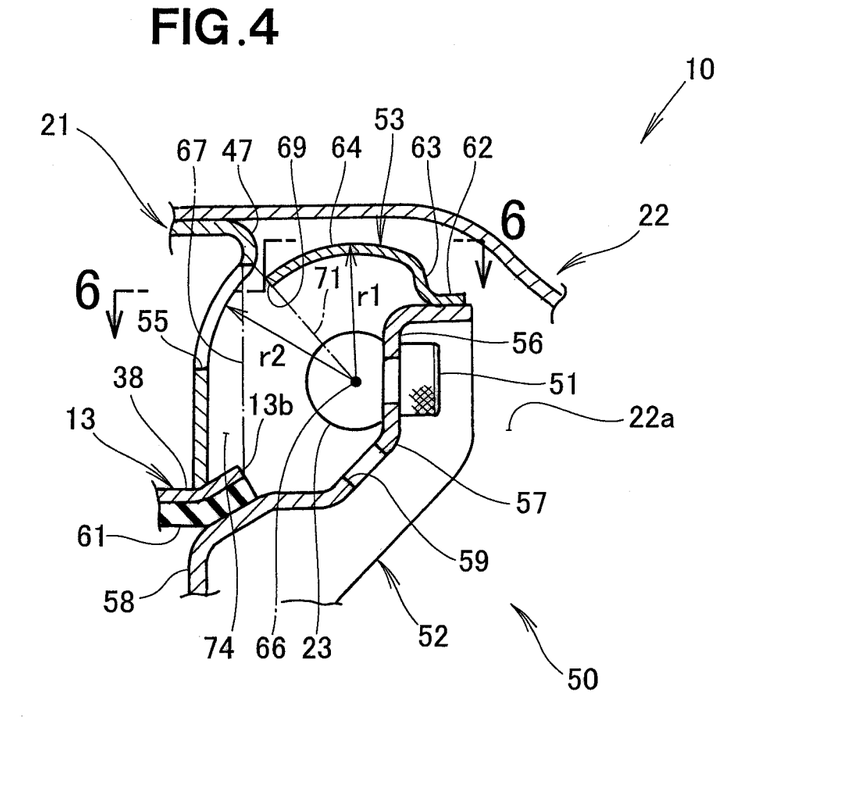
FIG. 4 is an enlarged view of an area indicated by reference numeral 4.

As shown in FIG. 4, the second valve body 53 includes a base portion 62 secured to the fixed portion 56 of the first valve body 52, a rising portion 63 rising from the base portion 62, and a body portion 64 extending from a distal end of the rising portion 63 for closing the communication port 55.

The body portion 64 includes an outer peripheral surface having an arc-shape having a radius r1 and a center provided by a central axis 66 of the valve shaft 23. The communication port 55 is defined by a portion of the joining section 21, and this portion includes a surface facing the housing section 22 and having an arc-shape having a radius r2 and a center provided by the central axis 66 of the valve shaft 23.

The radius r1 is smaller than the radius r2 (r1<r2). Because of r1<r2, the second valve body 53 does not contact the joining section 21. That is, a predetermined gap remains between an outer peripheral surface of the second valve body 53 and the communication port 55 even when the second valve body 53 closes the communication port 55 by rotating counterclockwise.

The second valve body 53 is attached to the first valve body 52 supported by the valve shaft 23, and the communication port 55 is formed proximate the valve shaft 23. Since the communication port 55 is formed proximate the valve shaft 23, the second valve body 53 extending from the first valve body 52 is small in size, and whereby the valve 50 is small in size.

The second valve body 53 has the arc-shape having the center provided by the valve shaft 23. The second valve body formed into the arc-shape has the advantage that the second valve body can rotate in a small area from an open position in which the communication port 55 is open to a closed position in which the communication port 55 is closed. Since the second valve body can rotate in the small area, the housing section accommodating the valve is small in size, and hence the exhaust heat recovery apparatus including the small-sized housing section is also small in size.

As indicated by an imaginary line 67, part of the communication port 55 is aligned with the downstream end portion 13b of the first flow passage section 13. The communication port 55 is provided at a location aligned with the downstream end portion 13b of the first flow passage section 13, namely, the communication port 55 is provided proximate the downstream end portion 13b of the first flow passage section 13. Since the communication port 55 is provided proximate the downstream end portion 13b of the first flow passage section 13, the valve 50 is small in size.

The second valve body 53 has a distal end portion 69 located on a line 71 extending from the central axis 66 of the valve shaft 23 to an end of the communication port 55. This makes it possible for the second valve body 53 to rotate in the small area to the closed position to close the communication port 55. Since the second valve body 53 rotates in the small area to close the communication port 55, the valve 50 is small in size.

The radius r1 of the arc-shape of the outer peripheral surface of the body portion 64 can be adjusted by change to a length of the rising portion 63. That is, a dimension of the second valve body 53 can be adjusted with easy means. The rising portion 63 provides the second valve body 53 with an increased rigidity. Since the rigidity of the second valve body 53 is high, the second valve body 53 maintains its dimension adjusted once. Since the adjusted dimension of the second valve body 53 is maintained, the outer peripheral surface of the body portion 64 is kept from contacting the joining section 21.

The joining section 22 to be connected to the housing section 22 will be detailed with reference to FIG. 5A to 5C and FIG. 6.

Figure 5A:
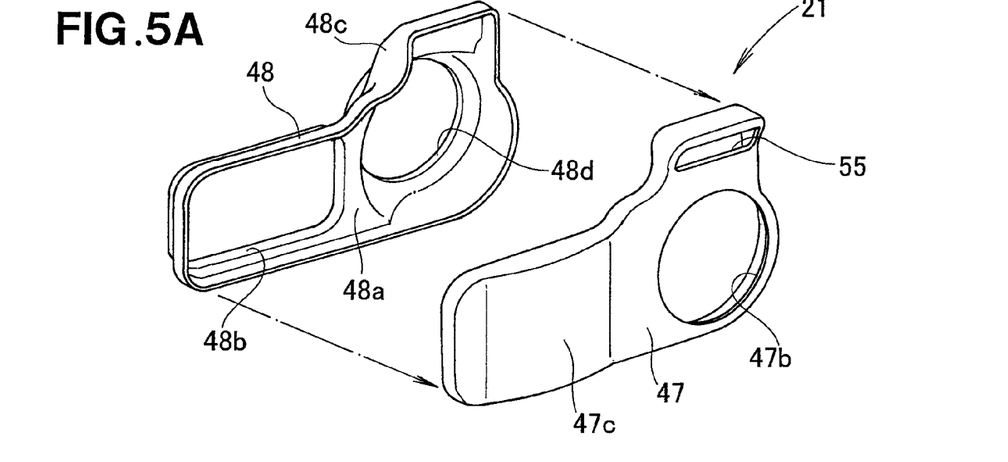
FIG. 5A is an exploded perspective view of a joining section shown in FIG. 1.

As shown in FIG. 5A, the joining section 21 includes the first member 47 of generally L-shape and the second member 48 of L-shape. The communication port 55 defined by the first member 47 has a generally rectangular shape. The opening 47 has an inner diameter equal to an outer diameter of the enlarged diameter portion 38 (FIG. 5C) of the first flow passage section. The distal end 48d of the second member 48 has an inner diameter equal to an outer diameter of the base portion 37 of the first flow passage section.

Figure 5B:
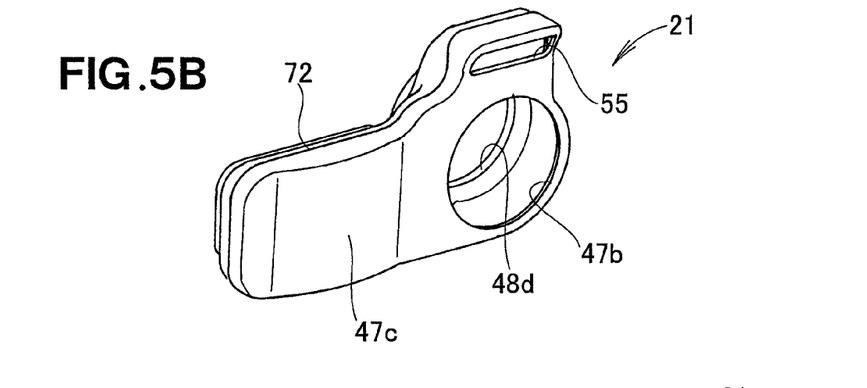
FIG. 5B is a perspective view of the joining section.

To assemble the joining section 21, the first member 47 and the second member 48 are fitted together. Then, the first member 47 and the second member 48 are welded together, as shown in FIG. 5B, to thereby assemble the joining section 21.

Figure 5C:
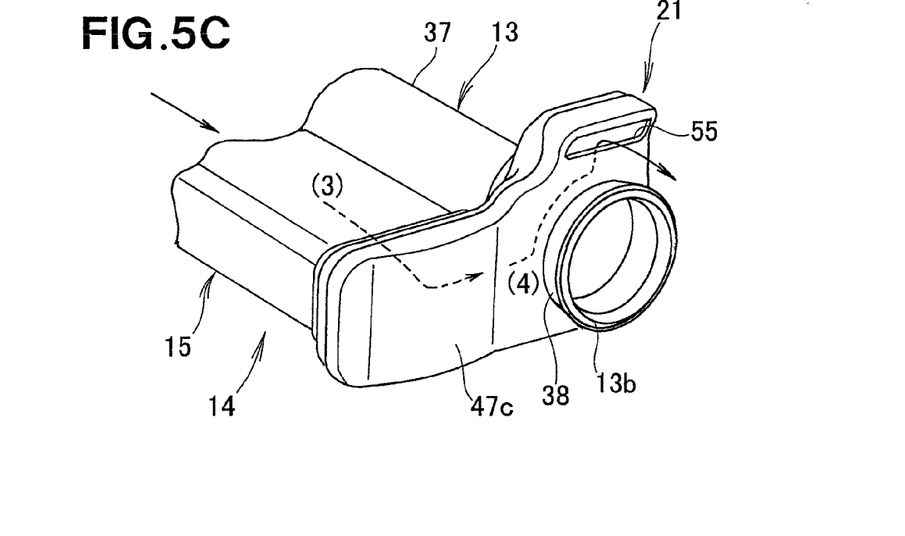
FIG. 5C is a perspective view of the joining section attached to first and second flow passage sections.

After the joining section 21 is assembled, the first flow passage section 13 and the second flow passage section 14 are connected to the assembled joining section 21.

Referring to FIG. 2, when an exhaust gas introduced from the inlet section 11 with the first valve body 52 closing the downstream end portion 13b of the first flow passage section 13, the exhaust gas flows through the branched portion 12 toward the heat exchanger 15, as indicated by an arrow (2).

As shown in FIG. 5C, the exhaust gas flowing through the heat exchanger 15 is directed into the joining section 21, as indicated by an arrow (3). As indicated by an arrow (4), the exhaust gas then flows along an outer periphery of the first flow passage section 13 within the joining section 21, after which the exhaust gas is discharged out from the communication port 55.

Figure 6:
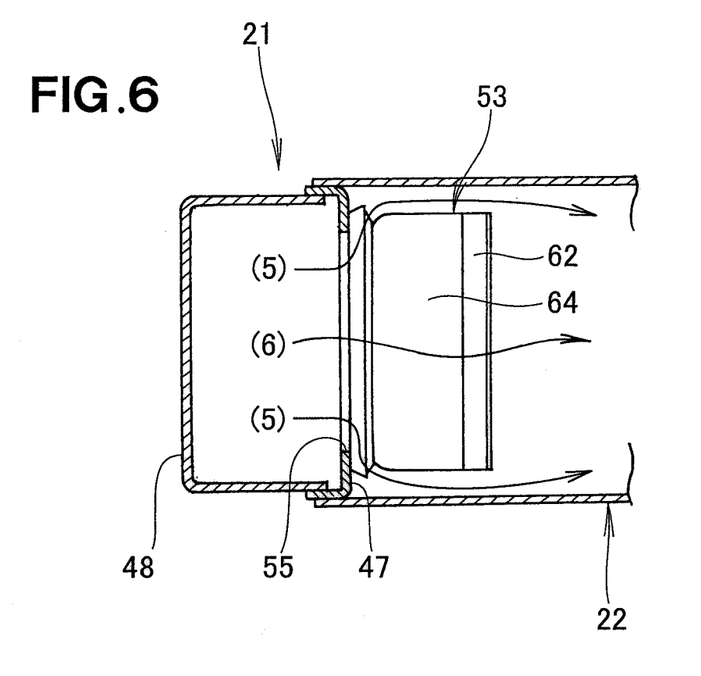
FIG. 6 is a cross-sectional view taken along line 6-6 of FIG. 4.

As shown in FIG. 6, the exhaust gas discharged from the communication port 55 is separated into two flows of exhaust gas along opposing lateral sides of the second valve body 53, as indicated by arrows (5) and (5), or passes above the second valve body 53, as indicated by an arrow (6). During discharge of the exhaust gas from the communication port 55, heat exchange occurs in the heat exchanger 15. The heat exchange is completed when the medium in the heat exchanger 15 is sufficiently heated.

The heat exchange in the heat exchanger 15 increases a temperature of the medium in the heat exchanger 15. The medium 15 having the increased temperature is circulated into the medium introducing member 16 (FIG. 1). That is, the medium in the medium introducing member 16 increases in temperature. The increase in temperature of the medium in the medium introducing member 16 activates the thermo-actuator 17 supported by the medium introducing member 16. When the thermo-actuator 17 is activated by the increase in temperature of the medium, the distal end portion 17a of the thermo-actuator 17 is advanced against an urging force of the urging member 24. The advancement of the distal end portion 17a of the thermo-actuator 17 rotates the valve shaft 23 counterclockwise.

Figure 7A:
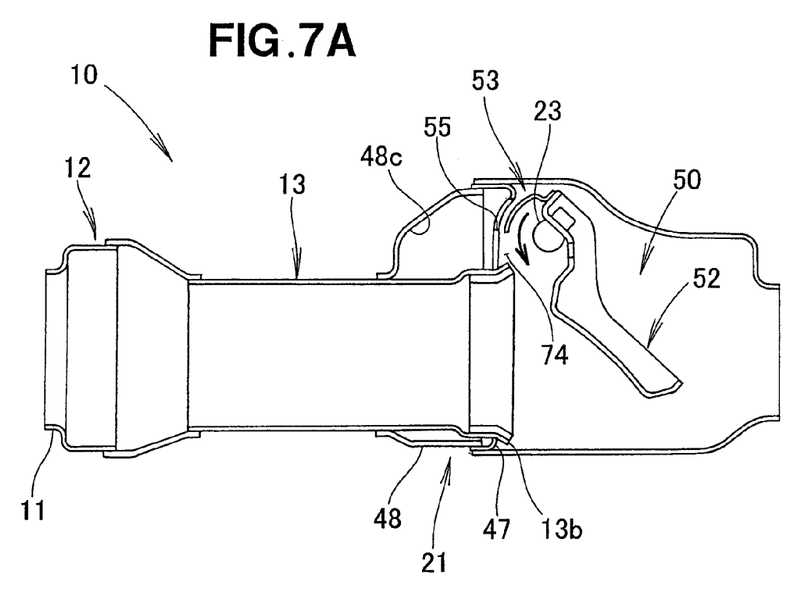
FIG. 7A and FIG. 7B are views showing functions of a valve shown in FIG. 3.

As shown in FIG. 7A, the valve shaft 23 is rotated counterclockwise as the temperature of the medium in the medium introducing member 16 increases. The counterclockwise rotation of the valve shaft 23 moves the first valve body 52 to an open position and the second valve body 53 to the closed position. The movement of the first valve body 52 to the open position allows an exhaust gas to flow through the first flow passage section 13.

Even if the temperature of the medium is low, the first valve body 52 is forced by an exhaust gas to move to the open position when a flow rate of an exhaust gas exceeds a predetermined one. If the flow rate of the exhaust gas is large, the exhaust gas is partially directed into the first flow passage section 13 to thereby provide an appropriate amount of exhaust gas to the heat exchanger 15.

The second valve body 53 in the closed position is spaced a predetermined distance from the communication port 55. The spacing of the second valve body 53 from the communication port 55 prevents contact between the second valve body 53 and the joining section 21. It is not likely that a noise is generated due to contact between the second valve body 53 and the joining section 21. There is no need to provide the second valve body 53 with an additional member for preventing the noise, whereby the valve 50 has the reduced number of parts.

The spacing of the second valve body 53 from the communication port 55 makes it possible for the valve 50 to rotate smoothly even if the joining section 21 or the second valve body 53 is expanded by heat of an exhaust gas.

Referring to FIG. 1, a change in an air pressure within the heat exchanger or the like may increase a temperature of the medium in the heat exchanger 15 to above a predetermined temperature. As the temperature of the medium increases to the predetermined temperature, a wax in the thermo-actuator 17 may expand to above a predetermined volume, whereby the distal end portion 17a of the thermo-actuator 17 may be advanced a distance longer than a predetermined distance. The advancement of the distal end portion 17a in excess of the predetermined distance is called an "overlift".

To address the overlift, a thermo-actuator usually includes overlift absorbing means for accommodating an excess by which a distance of advancement of a distal end portion of the thermo-actuator is longer than a predetermined distance. The overlift absorbing means include, for example, a coil spring.

However, the overlift absorbing means such as the coil spring undesirably makes the size of the thermo-actuator large. An exhaust heat recovery apparatus with such a large-sized thermo-actuator may be large in size. The exhaust heat recovery apparatus according to the present invention addresses the overlift, as shown in FIG. 7B.

Figure 7B:
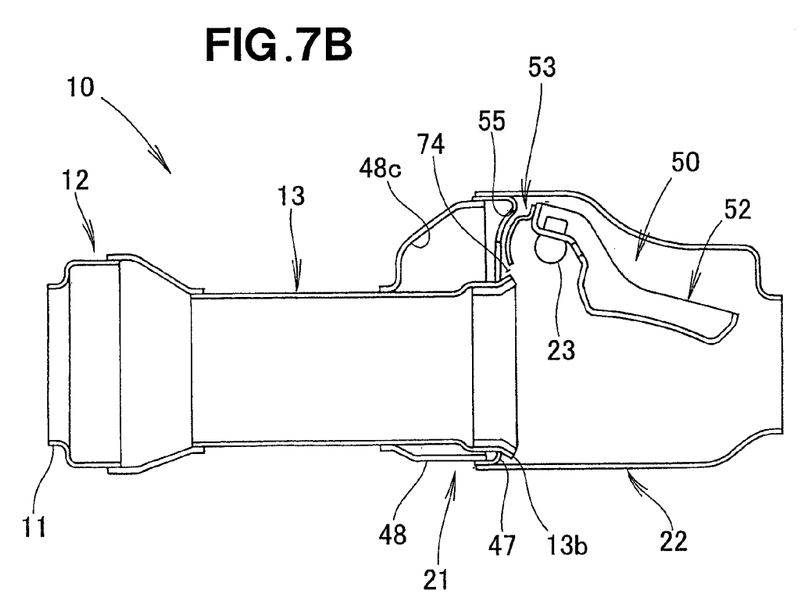

As shown in FIG. 7B, a space below the communication port 55 and above the downstream end portion 13b of the first flow passage section 13 provides an overlift absorbing part 74. That is, the overlift absorbing part 74 is defined between the communication port 55 and the downstream end portion 13b of the first flow passage section 13. The valve 23 may rotate more than a predetermined angle from a position shown in FIG. 7A, in which case the overlift absorbing part 74 accommodates an excess by which an angle of rotation of the valve shaft 23 is greater than the predetermined angle, as shown in FIG. 7B.

Since the space which would be otherwise a dead space is used as the overlift absorbing part 74, it becomes possible to accommodate the overlift without having to making a size of the housing section 22 larger. Since the housing section 22 has the overlift absorbing part 74 defined therein for accommodating the overlift, the thermo-actuator 17 (FIG. 1) need not have overlift absorbing means. The thermo-actuator 17, which does not have the overlift absorbing means, is small in size. Since the size of the thermo-actuator is small and the size of the housing section 22 is kept small, the size of the exhaust heat recovery apparatus 10 is small.

The exhaust heat recovery apparatus according to the present invention is applicable to not only a vehicle but also a vessel or others.

Obviously, various minor changes and modifications of the present invention are possible in light of the above teaching. It is therefore to be understood that within the scope of the appended claims the invention may be practiced otherwise than as specifically described.

What is claimed is:

1. An exhaust heat recovery apparatus comprising:
   an inlet section for introducing an exhaust gas thereinto, the inlet section having a downstream end;
   a branched section connected to the downstream end of the inlet section;
   a first flow passage section having one end connected to the branched section, the first flow passage section extending downstream from the branched section, the first flow passage section having a downstream end portion;

a second flow passage section extending downstream from the branched section and bypassing the first flow passage section, the second flow passage section having a downstream end portion;

a heat exchanger disposed within the second flow passage section for providing heat exchange between an exhaust gas and a medium disposed within the second flow passage section;

a joining section extending from the downstream end portion of the second flow passage section to the first flow passage section;

a housing section connected to the joining section and the downstream end portion of the first flow passage section;

a valve shaft supported by the housing;

a valve supported by the valve shaft for rotating in such a manner that the exhaust gas introduced into the inlet section flows through the branched section and at least one of the first flow passage section and the second flow passage section, wherein the joining section has a communication port formed proximate the valve shaft for directing an exhaust gas from the second flow passage section into the housing section, wherein the valve includes a first valve body supported by the valve shaft for closing the downstream end portion of the first flow passage section, and a second valve body extending from the first valve body for closing the communication port of the joining section, wherein the first valve body and the second valve body are disposed circumferentially of the valve shaft, and wherein the second valve body has an arc-shape having a center provided by the valve shaft.

2. The apparatus of claim 1 wherein the joining section has a protrusion portion protruding in a direction away from the housing section.

3. The apparatus of claim 1 wherein the second valve body is spaced a predetermined distance from the communication port when the second valve body closes the communication port.

* * * * *